(12) United States Patent
Friedrich

(10) Patent No.: US 8,577,295 B2
(45) Date of Patent: *Nov. 5, 2013

(54) METHOD AND APPARATUS FOR DATA COMMUNICATION BETWEEN A BASE STATION AND A TRANSPONDER

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,875

(22) Filed: Aug. 27, 2012

(65) Prior Publication Data

US 2012/0320797 A1    Dec. 20, 2012

Related U.S. Application Data

(63) Continuation of application No. 13/051,758, filed on Mar. 18, 2011, now Pat. No. 8,254,841, which is a continuation of application No. 11/105,539, filed on Apr. 14, 2005, now abandoned.

(30) Foreign Application Priority Data

Apr. 14, 2004  (DE) ..................... 10 2004 018 539

(51) Int. Cl.
  *H04B 7/00*  (2006.01)
(52) U.S. Cl.
  USPC ............... 455/41.2; 340/10.1; 370/395.62
(58) Field of Classification Search
  USPC ............ 455/41.1–41.3, 208; 370/395.62; 340/10.1–10.52
  See application file for complete search history.

(56) References Cited

U.S. PATENT DOCUMENTS

| | | | |
|---|---|---|---|
| 4,837,779 A | 6/1989 | Lundgren |
| 5,345,231 A | 9/1994 | Koo |
| 5,649,295 A | 7/1997 | Shober |
| 6,177,861 B1 | 1/2001 | MacLellan |
| 6,480,100 B1 | 11/2002 | Frieden |
| 6,747,571 B2 | 6/2004 | Fierro |
| 6,946,950 B1 | 9/2005 | Ueno |
| 7,026,935 B2 | 4/2006 | Diorio |

(Continued)

FOREIGN PATENT DOCUMENTS

| | | |
|---|---|---|
| DE | 0 473 569 | 3/1992 |
| DE | 100 50 878 | 5/2002 |

(Continued)

OTHER PUBLICATIONS

The Palomar project (Passive Long distance Multiple Access UHF RFID system); contributors: VTT, Idesco, Rafsec, Atmel Germany, Atmel Nantes; Deliverable D7, Version V2.1; Status: public, Oct. 31, 2002.

(Continued)

*Primary Examiner* — Christian Hannon
(74) *Attorney, Agent, or Firm* — Baker Botts LLP

(57) ABSTRACT

In certain embodiments, a transponder comprises a transceiver configured to receive a forward link having a forward-link header comprising at least one symbol for configuring a setting of the transponder. The transponder may be configured to transmit a return link having a return-link header comprising information based on one or more characteristics of the transponder, and to receive a modified subsequent symbol of the forward-link header. The modified subsequent symbol of the forward link header generated by analyzing the return-link header to determine adjusted information for configuring the setting of the transponder and modifying the subsequent symbol of the forward-link header in accordance with the adjusted information for configuring the setting of the transponder.

20 Claims, 2 Drawing Sheets

(56) References Cited

U.S. PATENT DOCUMENTS

| | | |
|---|---|---|
| 7,075,436 B2 | 7/2006 | Shanks |
| 7,352,695 B2 | 4/2008 | Pauwels |
| 8,254,841 B2 * | 8/2012 | Friedrich .................. 455/41.2 |
| 2002/0044595 A1 | 4/2002 | Friedrich |
| 2003/0104848 A1 | 6/2003 | Brideglall |
| 2003/0133435 A1 | 7/2003 | Friedrich |
| 2005/0018639 A1 | 1/2005 | Friedrich |
| 2005/0053024 A1 | 3/2005 | Friedrich |

FOREIGN PATENT DOCUMENTS

| | | |
|---|---|---|
| DE | 02/095672 | 11/2002 |
| DE | 101 38 217 | 3/2003 |
| DE | 102 04 317 | 8/2003 |
| DE | 102 04 346 | 8/2003 |
| DE | 102 04 347 | 8/2003 |
| DE | 1 501 250 | 1/2005 |
| DE | 1 508870 | 2/2005 |
| DE | 103 35 003 | 2/2005 |

OTHER PUBLICATIONS

Annala et al., *"Palomar—an European answer for passive UHF RFID applications?"* pp. 1-7, XP002337562, Sep. 3, 2001.

ISO; "ISO 18000-6: RFID for item management, part 6," ISO Standards, pp. 1-134, XP001207216, Aug. 15, 2004.

* cited by examiner

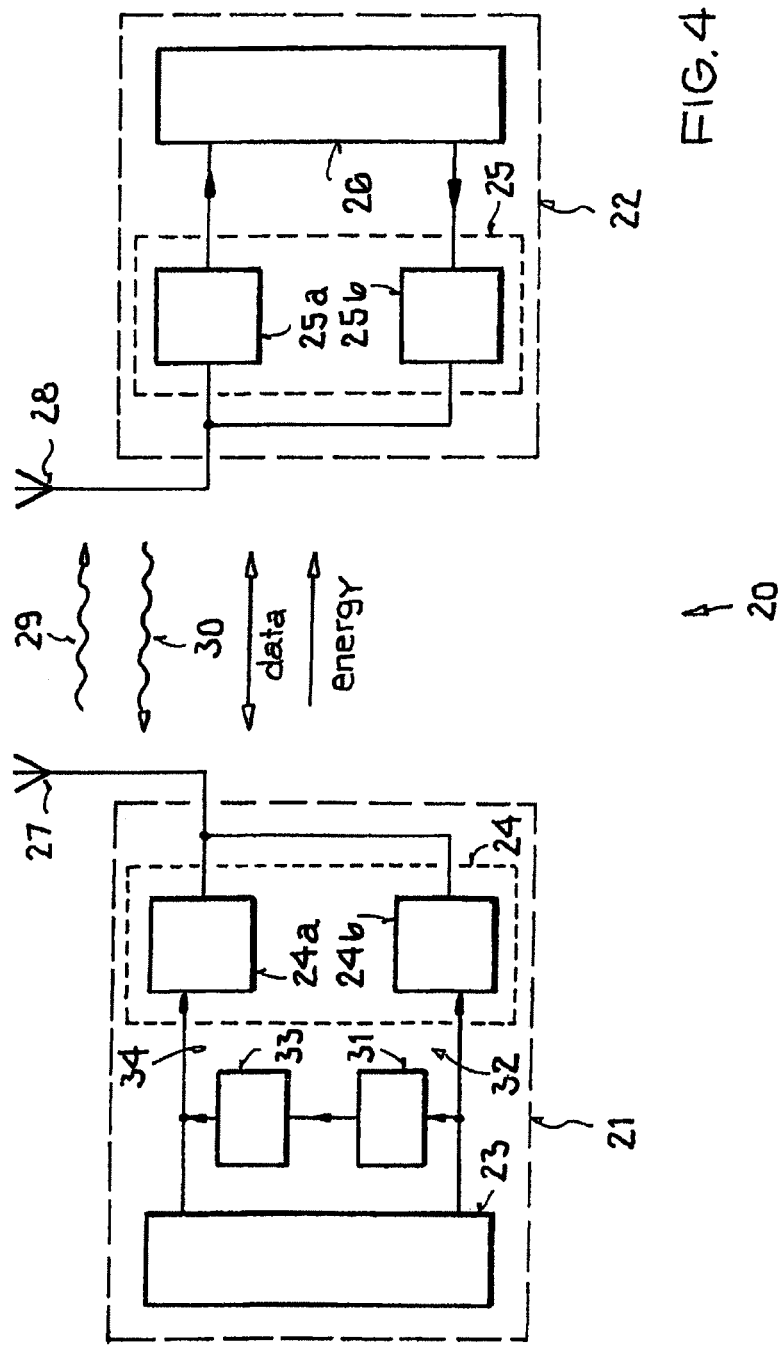

METHOD AND APPARATUS FOR DATA COMMUNICATION BETWEEN A BASE STATION AND A TRANSPONDER

RELATED APPLICATIONS

This nonprovisional application is a continuation under 35 U.S.C. §120 of U.S. application Ser. No. 13/051758, filed 18 Mar. 2011, and entitled "Method and Apparatus for Data Communication Between a Base Station and a Transponder," which is a continuation, under 35 U.S.C. §120, of U.S. application Ser. No. 11/105539, filed 14 Apr. 2005, which claims priority under 35 U.S.C. §119(a), to German Patent Application No. DE 102004018539.5, filed 14 Apr. 2004.

BACKGROUND OF THE INVENTION

1. Field of the Invention

The present invention relates to a method for data communication between a base station and at least one transponder by, for example, a high-frequency electromagnetic carrier signal onto which information packets are modulated. Each information packet can have a header section, a middle section, and a trailer section. The header section can be provided in a forward link of a data communication between the base station and the transponders for controlling the data communication. The header section can be used in a return link of a data communication in order to transmit information from a transponder to the base station communicating with this transponder. The invention further relates to a base station and a data communication system.

2. Description of the Background Art

The invention resides in the field of transponder technology and more particularly in the field of contactless communication for the purposes of identification. Although applicable in principle to any desired communication systems, the present invention and the problems it was designed to solve are explained below with respect to so-called RFID communication systems and their applications. RFID stands for "Radio Frequency Identification." For general background on RFID technology, please refer to the "RFID Handbuch" by Klaus Finkenzeller, third revised edition, 2002, which has been published in English by John Wiley & Sons.

In the case of transponders, an electromagnetic signal sent out by a base station is received and demodulated by the transponder. In this context, a distinction is made between active, semi-passive, and passive transponders, depending on how their energy supply is implemented. In contrast to active transponders, passive transponders have no energy supply of their own, so the energy required in the transponder for demodulation and decoding of the received electromagnetic signal must be extracted from the very electromagnetic signal transmitted by the base station. In addition to this unidirectional transfer of energy, bi-directional data communication between the base station and transponder typically also takes place.

The foundation for bi-directional data transmission between base station and transponder is what is referred to as a communication protocol, which defines control information for the data communication in addition to the data transmission to be transmitted.

A generic RFID communication protocol for a prior art data communication between base station and transponder is described in the unexamined German application [Offenlegungsschrift] DE 101 38 217 A1. According thereto, an information packet to be transmitted by the base station to a transponder has at least a header section, a middle section, and a trailer section. The header section defines the amount of data to be transmitted and its identification. The middle section contains the specific data to be transmitted. In the trailer section, the end of the information packet is communicated to the receiver of the specific data that has been transmitted. The data communication is protected with protection mechanisms such as a CRC protection field or parity bits, for example.

A generic RFID method and system for bi-directional data communication is also the subject matter of the Palomar Project, which was established by the European Commission as part of the IST Program. For further information on the content of the Palomar Project, please refer to the generally accessible publication of the European Commission issued on Jan. 11, 2002, which essentially corresponds to ISO standard 18000-6.

For further background on bi-directional data communication between the base station and the transponder, please also see the unexamined German applications DE 102 04 317 A1, DE 100 50 878 A1 (which corresponds to U.S. Publication No. 20020044595), DE 102 04 346 A1 and the European patent EP 473 569 B1.

In most UHF and microwave based RFID systems or sensor systems, data communication between the base station and the transponder is first initiated by the base station in that the base station transmits a query signal (command, data request) to the various transponders located in the vicinity of the base station. The transponder or transponders participating in the data communication typically react to this query with a response signal (response).

The method known as the backscatter technique is one method used for data transmission from a base station to a transponder and back by UHF waves and microwaves. In this method, first the base station emits high-frequency electromagnetic carrier signals, which are received and processed by the transmitting and receiving device in the transponder. In addition, the received signals are modulated with a customary modulation method and are scattered back using the backscatter cross-section of the transponder's transmit/receive antenna. Typical modulation methods for this purpose are amplitude modulation, phase modulation and amplitude shift keying (ASK) subcarrier modulation of the backscatter signal, in which the frequency and/or the phase position of the sidebands is changed.

The data to be transmitted are coded and transmitted with the aid of symbols, which are defined, for example, by the header section of an information packet. In this context, a symbol is used to define or interpret the value of a character to be transmitted. A symbol is customarily represented with the aid of a time period between two sequential field gaps, or so-called "notches." With amplitude modulation, such a field gap can be created, for example, by suppressing or blanking the carrier signal; or with double-sideband modulation, it can be created by switching the phase position of the carrier signal. The transponder decodes received information packets on the basis of the symbols contained in the header section, or using the time periods associated with the symbols, in that it determines the value of a transmitted signal by comparing its time period with the predefined time period of a symbol in the header section.

Through the selection of the time interval, or the time periods assigned to the symbols, it is possible to adapt the transmission rate to the transmission conditions within a certain range.

In the unexamined German application DE 102 04 317 A1, a generic method for data transmission is described in which defined points in time, or reference times, are defined in the header section. The carrier wave is only examined at these predefined points in time. This method permits error correction during the data transmission by means of the change in the modulation state at predefined points in time.

U.S. Pat. No. 5,649,295 describes an RFID communication system in which the return data transmission takes place with the use of a backscatter method. In this system, the base station transmits a first piece of information to at least one transponder of the communication system, the transponder(s) receive the signal transmitted by the base station, decode it, and take the first piece of information from it. The transponders also have a backscatter modulator, which modulates the backscattered signal derived from the transmitted signal by using a second piece of information derived from the first piece of information. The content of the second piece of information in the backscattered signal contains the data rate or the modulation for the signals backscattered by the transponder, for example.

A similar method for data communication between the base station and the transponder in which the base station controls a piece of information for the transponder's operating information, as for example its modulation or data rate, is described in the German patent application number DE 10335003, which corresponds to U.S. Publication No. 20050053024. In this method, the base station transmits an information packet having a header section, a data section and a trailer section. During transmission of the header section of an information packet by the base station, the transponder communicating with this base station transmits, using the backscatter method, operating information of the transponder relating to the processing of data to be received by and/or transmitted by the transponder. The base station receives this transponder operating information and adjusts at least one transmission parameter for further data communication between the base station and the transponder on the basis of this information.

Most UHF and microwave-based RFID systems or sensor systems are designed as master/slave systems. In such master/slave-based RFID systems, the data communication between the base station and the transponder is controlled by the base station. As described in DE 102 04 347 A1, the control takes place through the header section of an information packet. By means of this header section, or rather, the information contained therein, the base station sets operating parameters of the transponder.

However, existing RFID systems are distinguished in particular by the use of an extremely wide variety of transponders, with the differences among the various transponders deriving primarily from their differing functionalities. In particular, asynchronous transponders must generate their own clock frequency by a separate clock generator internal to the transponder.

The problem with this, however, is that the precise clock rate of the transponder is not known to the base station. Furthermore, the base station also does not know what resolution a given transponder is working with. This is especially serious for the demodulation and decoding by the transponder of the signals transmitted by the base station, since such transponders with a very low resolution are not capable of decoding with high reliability the symbols transmitted at a high data transmission rate by the base station, for example. Especially at very high data transmission rates, such transponders, because of their low resolution, find it correspondingly difficult to distinguish the various symbols from one another, for example "0", "1", "EOT". Data communication with such inexpensive, "low cost" transponders is thus comparatively error-prone, particularly when the base station is informing such a transponder by means of the header section that a relatively high data transmission rate is desired, but the transponder does not support this rate because of its structure.

SUMMARY OF THE INVENTION

It is therefore an object of the present invention to provide an improved and more flexible data communication between base station and transponder. The data communications and/or the data communication system should also be adaptable to the greatest degree possible to the particular transponders in use. A further object of the present invention is to make the duration of a data communication less error-prone.

Accordingly, provision is made for a method for wireless data communication between a base station and at least one transponder by, for example, a high-frequency electromagnetic carrier signal onto which information packets are modulated, wherein each information packet can have a header section, a middle section, and a trailer section. The header section can be provided in a forward link of a data communication between the base station and the transponders for controlling the data communication. Also, the header section can be used in a return link of a data communication in order to transmit information from a transponder to the base station communicating with this transponder.

In addition, the present invention provides a base station for data communication with at least one transponder, having a transmitting/receiving device for transmitting, for example, high-frequency carrier signals to the at least one transponder and for receiving corresponding response signals from the at least one transponder receiving the carrier signals. A control unit can be provided in order to control the data communication with the at least one transponder. The system can also include an analysis device which follows the transmitting/receiving device on the receive side and analyzes the header section of the response signals transmitted by the transponder. Further, an adjusting device that carries out an adaptation to the control information transmitted to the transponder in the header section of the forward link, especially by using the analyzed response signals can also be provided.

The data communication system according to an example embodiment, can be a RFID data communication system, having at least one transponder and having at least one base station according to the invention.

The concept underlying the present invention is in using the header section in the return link of a data communication between the base station and the transponder for data communication. To this end, the transponder advantageously transmits in the header section, for example, in the first or in the second symbol, or alternatively also in the third or fourth symbol, of the header section, at least one reference mark to the base station that the base station can analyze for further data communication. After analysis of these reference marks, the base station can perform a tailored adjustment of the additional identifiers in the header section of the forward link. In this way, in contrast to the known control mechanisms that were described in detail in the foregoing evaluation of prior art, the inventive data communication system is enhanced to become a closed-loop system. The base station and the transponder interact here in such a manner that the transponder, in response to operating and control information transmitted by the base station, now in turn transmits corresponding information about its operating resources to the base station.

The header section in the return link of an information packet can be used to establish a data communication between base station and transponder and then to further optimize it. This data communication describes a so-called closed-loop control principle, which thus advantageously provides the base station with the opportunity to set or adapt the operating parameters of the transponder very rapidly. In particular, the inventive method is especially suited for those cases in which inherent operating parameters of the transponder potentially change, for example, as a result of external influences. In this case, the inventive closed-loop control mechanism makes possible a very rapid and, in particular, dynamic setting of the optimal operating parameters for the transponder in data communication between the base station and the transponder.

The base station can also adapt the further data communication optimally to the resources available to the transponders in question, since the base station now knows what these resources are. By contrast, in existing systems, in which the base station has merely transmitted control information for the desired operating information of a transponder, the base station had no information at all on the resources actually available from a transponder. Thus the base station could not optimally adapt further data communication to the available resources and operating modes of the transponder in question by the control mechanisms available to the base station.

The inventive closed-loop control mechanism also makes it possible to verify the control information transmitted by the base station in its header. It is thus also possible, after verification by the base station, to additionally optimize further data communication from the base station to the transponders and back by transmission of additional identifiers in the header section.

Via the reference marks transmitted by a transponder in its header section, the transponder can transmit various operating information and information concerning its resources to the base station.

Also, via this reference mark, the transponder can transmit to the base station information that contains the resolution with which it decodes the signals transmitted by the base station, for example.

In addition, a transponder can also transmit information about its operating mode, which is to say whether it is operated synchronously or asynchronously, to the base station.

In the case of an asynchronous operating mode, the transponder must generate its own system clock. In this case, it is also possible for the transponder to transmit information about its system clock to the base station.

Moreover, a transponder can also contain information on the modulation of the transponder.

In an advantageous example embodiment, the transponder transmits to the base station, in the header section of the return link, at least one reference mark that is analyzed by the base station for further data communication. After analysis by the base station of this at least one reference mark, the control information in the header section of the forward link is adjusted to the at least one analyzed reference mark. Because the base station analyzes the reference marks returned by the transponder, which can contain information on the modulation, the resolution, the data rate and/or additional information of the transponder relevant to operation, in the next step the base station can advantageously optimize some or all of these parameters. In particular, the base station is now able to define the data rate at which the data communication from the base station to the transponder and back should be continued in such a manner that optimum communication, adapted to the aforementioned parameters, can take place. In addition or alternatively, the base station can also specify a desired modulation of the base station and the transponder, which presumably ensures the most reliable and effective possible data communication.

A reference mark containing the clock information, which is transmitted by the transponder to the base station, for example, can be preferably sent in the first symbol of the header section in the return link.

In an advantageous example embodiment, a first reference time is specified in the forward link by which a second reference mark representing a first logical value and a third reference mark representing a second logical value are defined. Because the base station analyzes the information transmitted by the transponder in the return link by means of the reference marks, the base station can adapt the first reference time optimally for the specific information obtained. In particular, it can set the first reference time such that it is tailored to the resolution used by the transponder in question. The first reference time is preferably specified in the second symbol of the header section in the forward link by the base station. Thus, the preamble in the return link can be shortened significantly.

Especially for such data communication systems, in which the base station analyzes the information returned by the transponder, for example, in the return link or by backscattering, the base station must first be informed of the point in time during a symbol transmitted in the return link at which the relevant signal can be interpreted as a logic zero ("0") or as a logic one ("1"). It is advantageous for this likewise to be realized by means of reference marks transmitted by the transponder in the return link. Provision is made here, in particular, that the transponder transmits a reference mark representing a logic zero in a first symbol and a reference mark representing a logic one in a second symbol. The reference marks representing the logic zero and the logic one have different time separations with respect to the relevant notches. This information can now be used by the base station for the further data communication and in particular for the analysis of the signals sent by the transponder, since the base station now knows at which location within a symbol to expect a reference mark representing a logic zero or a reference mark representing a logic one.

In a further embodiment, a second reference time is specified in the forward link by which clock information and/or frequency information is transmitted to the transponder.

Also, the second reference time can be specified by the base station in the fourth symbol of the header section in the forward link.

The header section of the forward link and/or of the return link can have a total of four symbols.

A reference mark can be created, for example, by an amplitude change, which is to say by an increase or by a decrease of the amplitude in the signal returned by the transponder. Alternatively, a reference mark can also be created by switching off the transponder-side modulation for a predetermined period of time.

In an alternate embodiment, the aforementioned reference marks or their time separations with respect to one another and/or their time separations with respect to the relevant notches can be appropriately altered under control of the base station. In particular, the time separations can be adapted in this context appropriately for the operating parameters existing for a base station and the relevant transponder communicating therewith, and thus for an optimal data transmission rate and modulation.

In another example embodiment of the invention, provision can be made that a predefined time interval is provided which encompasses the points in time at which the first and second reference marks for a logic zero or a logic one are to be expected. Since only the points in time that are relevant for the logic zero or the logic one are examined for detection of the reference marks, and thus for demodulation and decoding, the remaining regions of a symbol can advantageously be ignored and thus masked out.

On the one hand, this is advantageously accompanied by a reduced analysis effort, and thus computational effort, for a program-controlled device, for example a microcontroller or a microprocessor, which is then available for other applications. The reduction in the analysis effort thus also results in a reduced power consumption of the overall system.

On the other hand, the reliability of demodulation and decoding is significantly improved by this means. In particular, marks which are similar to a reference mark on account of their signal shape, but are located in regions outside the time interval, are never taken into account at all. Thus only within the regions of the time interval are the signals transmitted by the transponder checked for the presence of a reference mark. Overall, this means that the probability of an erroneous analysis caused by such a mark is significantly reduced.

This time interval within a symbol is advantageously smaller than the duration of the symbol itself.

Instead of using a single first time interval, which encompasses both the reference marks, which is to say those representing a logic zero and a logic one, it is of course also possible to use two time intervals (second and third time interval), each of which includes one of these two reference intervals. This is particularly advantageous when the points in time within a symbol at which the reference marks are to be expected are widely separated. In this case, if a single time interval were used, a very large time span would have to be covered in order to reliably detect one of the two reference marks. When a second and a third time interval are used, the specific region between the aforementioned points in time, hence during which no reference marks are to be expected, can remain unexamined. The probability of an erroneous evaluation is reduced still further in this way.

Further, the sum of the second and third time intervals can be smaller than the first time interval.

The time interval or time intervals can be adapted in accordance with the resolution of the transponder in that, when the resolution of the transponder is very high, a very short interval or very short time intervals is/are used. The first, second, and/or third time interval can be advantageously adapted to the resolution of the transponder such that the first, second and/or third time interval is reduced with increasing resolution of the transponder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a block diagram showing the structure of an RFID communication system containing a base station and at least one transponder for carrying out the method according to an example embodiment of the invention.

DETAILED DESCRIPTION

Figure 1:
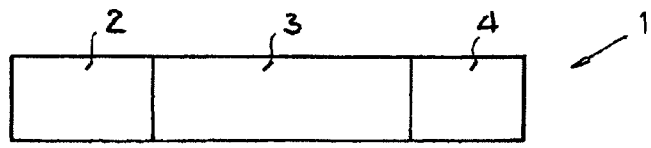
FIG. 1 shows a basic structure of an information packet for the forward and/or return link of a data communication between a base station and a transponder.

In the drawings, like or functionally like elements, data, and signals are identified with the same reference labels, unless otherwise specified. The representations in FIGS. 1-3 each relate to a time sequence of a specific data communication with respect to an information packet.

Data communication between a base station and a transponder defines a channel hereinafter referred to as the forward link VL (also sometimes called the downlink). Conversely, the data communication from the transponder back to the base station defines a channel that is generally referred to as the return link RL (also sometimes called the uplink). In addition to the data communication in the return link RL, in the case of transponders based on backscattering, there also takes place a data communication between the transponder and the base station in which a transmitted signal is scattered back to the transmitter using the backscatter cross-section of the receiver's antenna. This method is also generally known as the backscatter method. This data communication using the backscatter technique can be employed both in the forward link and in the return link.

Data transmission is accomplished by an amplitude-modulated carrier wave that is transmitted by the base station and sent back by the transponder. The data modulated onto the carrier wave are produced through pulse-interval modulation of the carrier signal in that the transmitter in the base station switches an electromagnetic field of the carrier signal on or off for specific time intervals. Thus a voltage signal derived from the field strength of the carrier signal is generated on the input side of the transponder; this signal voltage has voltage dips, which are also generally referred to as "notches." The data information now lies in the time interval between two such voltage dips. This time interval now contains one data symbol, or symbol for short. The field gap in which the base station transmitter is switched off, and therefore transmits no electromagnetic carrier signal, thus in a certain sense represents a separator between two successive symbols. The value of a data symbol is determined by the time span in which the electromagnetic field is switched on and thus the carrier signal has its nominal amplitude. A symbol can now contain a digital coding, for example a logic zero ("0") or a logic one ("1"), or additional information, such as an EOF (End Of file) symbol, for example.

Firstly, FIG. 1 shows the basic structure of an information packet 1 such as is used for a data communication between a base station and a transponder and as is known, for example, from the unexamined German application DE 101 38 217 A1 already mentioned above. In FIG. 1 it is assumed that the information packet 1 is designed for the data communication in the forward link VL of the data communication system, even though an information packet returned in the return link in response to this information packet 1 can have a similar structure.

The information packet 1 has a header section 2, a middle section 3, and a trailer section 4.

In the header section 2, the number of data symbols to be transmitted, and their identifiers, are defined. This is necessary in order to be able to determine the precise position at which a particular field within the middle section 3 or the trailer section 4 begins. This is necessitated by the fact that a duration Δt of an information packet 1 in general, and of the individual fields 2-4 in particular, is not predefined and largely constant, as is the case with many time-slotted data transmission methods. Rather, the duration Δt and thus the information transmitted within an information packet 1 can vary to a greater or lesser degree. The identifier within the header section 2 codes the data to be transmitted in the middle section 3. In particular, the header section 2 specifies reference times that are used for further data transmission in the middle section 3 or data field 5. The header section 2 also defines the speed of the data communication between base station and transponder, for example through the frequency of a free-running oscillator in the transponder. In addition, in a very advantageous embodiment, the header section 2 can also contain control information for the fields of the middle section 3 and trailer section 4 which follow the header section 2.

In this context, reference is made to German application DE 101 38 217 A1, which corresponds to U.S. Publication No. 20030133435, and which is hereby incorporated by reference, in particular with regard to the control mechanism which uses the header section of a data protocol to define the number of symbols employed for coding in the data region and their identifiers.

The middle section 3 includes in general a data field and a check field immediately following the data field. Coded data symbols are transmitted in the middle section 3. Depending on the desired application, an extremely wide variety of data structures (long command, short command) can be provided here, but this will not be discussed in detail here.

The content of the trailer section 4 indicates the end of the transmitted information packet 1 to the receiver of the information packet. In the event of the Palomar system described above, the trailer section 4 has exactly two EOT symbols (EOT=end of transmission).

Figure 2:
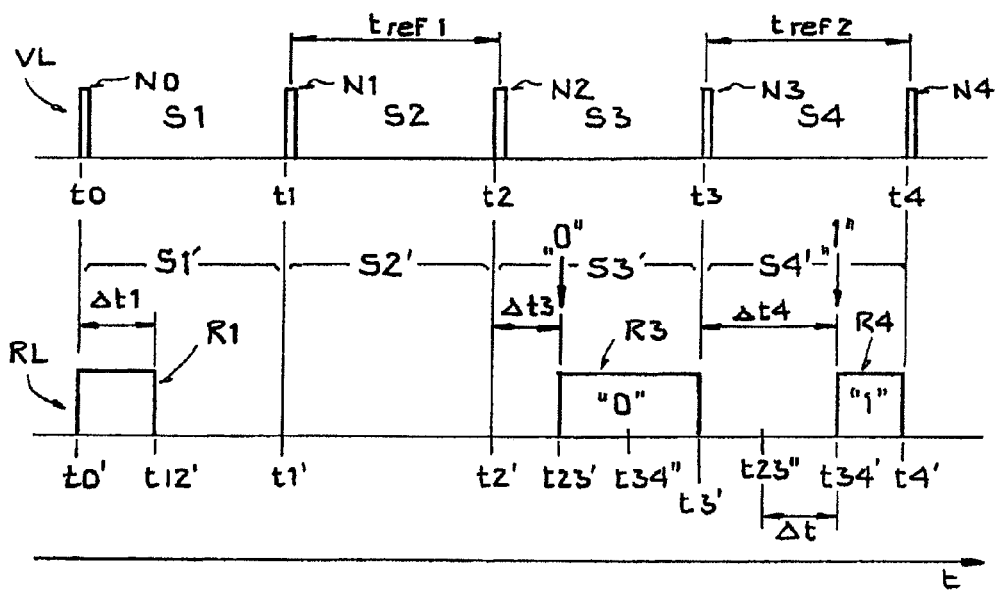
FIG. 2 illustrates a header section in the forward link and in the return link of a data transmission.

FIG. 2 shows, by way of example, a header section in each of the forward link VL and the return link RL of a data transmission. An example embodiment of the present invention is explained hereinafter on the basis thereof.

The header section 2 in the forward link VL has—in accordance with the Palomar system described above, or with ISO 18000-6—four symbols designated with reference characters S1-S4. In this context, each individual symbol S1-S4 is defined by a time separation of two adjacent notches N0-N4. Each of the time points t0-t4 designate the point in time when a notch N0-N4 is present. These notches N0-N4 are control signals generated by the base station. In particular, the control signals may be a field gap, at which the base station switches off the electromagnetic field for a predetermined period, or a modulation gap, at which the modulation is correspondingly switched off for a predetermined period.

Associated with each symbol S1-S4 is information that is supplied by the base station to the transponder through the forward link. This information sets operating parameters of the transponder, for example, the following settings:

Whether the transponder or the data transmission in the return link RL is to be synchronous or asynchronous with respect to the forward link VL. This setting can be made by a relative time duration of two or more symbols S1-S4, for example.

A symbol S1-S4 can take on the function of a bit length reference time for a given bit in the return link RL.

What modulation coding is to be used for transmitting the data stream from the transponder to the base station, for example, in the form of an NRZ, NRZI, FM0, 3phase1, or similar modulation.

The type of modulation (ASK, PSK) by which the transponder is to generate the data stream back to the base station.

How many subsymbols the header section in the return link should have.

Hence a symbol S1-S4 in the forward link VL and a symbol S1'-S4' in the return link RL designates a piece of information which is determined by a predefined time interval resulting from reference times t0'-t4', or t0-t4.

In the present example embodiment, it is assumed that a reference time tref1 is defined by the second symbol S2. This reference time tref1 serves as the reference time for modulation in the transponder.

It is further assumed that a second reference tref2 can be defined by the fourth symbol S4. The second reference time tref2 can be used for defining the system clock in the transponder in the case of synchronously operated transponders, which thus derive their system clock from the signal transmitted by the base station. For example, the transponder can generate an internal transponder system clock from this second reference time tref2 either directly or through division.

For asynchronously operated transponders, this second reference time tref2 can be used for determining the data rate at which the transponder is to transmit its data to the base station in the return link RL, for example. In particular, this second reference time tref2 can thus be used to set the speed of the overall data communication in a tailored manner.

The transponder extracts this information sent by the base station in the header section 2 and evaluates it. The transponder now sets its modulation in accordance with the first reference time tref1, and generates two reference marks R3, R4 using this selected modulation and proceeding from the transponder's inherent resolution. These two reference marks R3, R4 are transmitted back to the base station in the header section 2 of the return link RL and can be analyzed there. In the present case, the two reference marks R3, R4 are returned in the third and fourth symbols S3', S4' of the header section 2, and thus, in terms of time, directly after the second symbol S2 with which the base station defined the first reference time tref1.

The reference marks R3, R4 are generated at a time point t23', t34' predetermined by the transponder within a given symbol S3', S4'. The reference marks R3, R4 are produced in the form of signal changes or alternatively as signal pulses, which represent a measure for a data bit representing a logic zero or a logic one. In the present example embodiment, a logic zero is defined by an increase in the signal in the return link RL at the time point t23' in the symbol S3'. Similarly, a logic one is defined by an increase in the signal in the return link RL at the time point t34' in the symbol S4'.

The base station analyzes these two reference marks R3, R4 in the third and fourth symbols S3', S4' by calculating the time separation Δt3=t23'-t2', or Δt4=t34'-t3'. This analysis is based on the premise that the base station has precise knowledge of the time points t0'-t4', and in particular of the reference times t2', t3', which are derived from the corresponding notches N2, N3 in the forward link VL. The time points t0'-t4' are derived from the known time points t0-t4. Thus the base station can determine the time points t23', t34' within a given symbol S3', S4' during which an increase in a signal can be interpreted as a logic zero or a logic one.

On the basis of this analysis and the information thus obtained, the base station for its part can now change or adapt the first reference time tref1 such that the specific reference marks R3, R4 and/or the time points t23', t34' which represent them occur at the points desired by the base station in each case. In particular, the base station can appropriately optimize a time separation Δt=t34'-t23" (Δt=t34"-t23') of those time points within a symbol S3', S4' at which an increase in a signal is to be expected for a logic zero or a logic one, respectively. For example, this time separation Δt can be chosen to be shorter in the case of high resolution in the transponder, while in contrast the time separation Δt should rather be larger in the case of low resolution in the transponder.

Moreover, it would also be conceivable that the base station selects the most appropriate modulation type for the modulation of the transponder by the first reference time tref1.

Consequently, a closed-loop control mechanism is thus provided by which the base station first transmits a piece of configuration information to the transponder through the first reference time tref1, and the transponder for its part returns the results of these configurations to the base station through the reference marks R3, R4. After analyzing this information returned by the transponder, the base station can now adapt the configuration information to it, for example by the first reference time tref1. This can continue until a desired (optimal) data communication is present.

According to a second aspect of the present invention, the transponder transmits an additional reference mark R1, in the present case in the first symbol S1 of the header section 2 of the return link RL. This reference mark R1 provides an increase in the amplitude of a transmitted signal at the time point T0' and a decrease in this amplitude at time t12'. The time period Δt1=t12'−t0' here is a measure of the system clock of the transponder, so that clock information of the transponder is transmitted by the reference mark R1. By analysis of the time period Δt1 in the base station, the base station for its part can now influence this period Δt1, for example by the second reference time tref2, preferably in the last symbol S3. This last symbol is in any case used on the part of the base station to transmit clock information to the transponder. In this way, the system clock of the transponder can be set for the relevant application in a tailored manner through an additional closed-loop control mechanism.

This is particularly advantageous when the transponder is in an asynchronous operating mode and its system clock is generated within the transponder, for example by a current-controlled or voltage-controlled oscillator (ICO, VCO). In this way the transponder can share information about its system clock with the base station.

In the example embodiment in FIG. 2, the return link RL is shown synchronous with the forward link VL. The time points t0'−t4' in the return link RL then correspond to the respective time points t0-t4 in the forward link VL. In the present example embodiment, the symbols S1'-S4' in the return link, and thus the reference marks R1, R3, R4, are each synchronous with the corresponding symbols S1-S4 in the header section 2 of the forward link VL. This is not strictly necessary, however. It is only important that the base station knows the time points t0'−t4' in the return link RL as reference times for the start of respective symbols S1'-S4'. In this case the symbols S1'-S4' are shifted in time relative to the corresponding symbols S1-S4.

It would also be possible for each of the reference marks R1, R3, R4 to be transmitted during a different header section 2, for example the header section 2 of a subsequent information packet 1.

Figure 3:
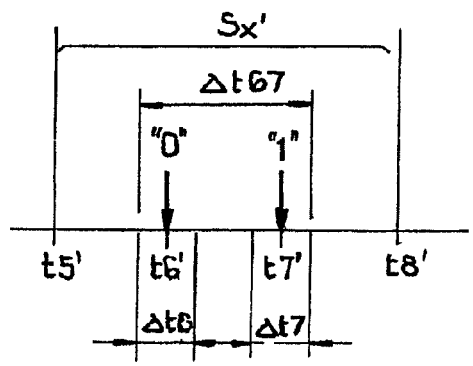
FIG. 3 shows an individual symbol in the return link of a data communication between base station and transponder.

FIG. 3 shows an individual symbol Sx' in the return link RL of a data communication between the base station and the transponder. This symbol Sx' is defined by the time slot between the times t5'-t8'. The points in time t6', t7' designate the points in time when a logical zero or logical one is to be expected with respect to the particular symbol Sx' and corresponding to the reference marks R3, R4 defined by the transponder (see FIG. 2). In prior art methods, the entire time slot, which is to say Δt=t8'−t5' between the time points t5-t8 of a particular symbol Sx', would have to be examined for an increase or a decrease in the signal transmitted by the transponder. The inventive solution now provides that only the time interval Δt67 is examined for such a change, with this time interval Δt67 being chosen such that it encompasses both time points t6 and t7. Thus T67>t7'−t6' here.

Alternatively, it would also be possible for two time intervals Δt6, Δt7 to be provided which encompass the respective time points t6' and t7'.

The particular advantage of these two solutions is in that a signal transmitted by the transponder in the return link RL is only examined by the base station for a change and thus for a reference mark R1, R3, R4 during these time intervals Δt67 or Δt6, Δt7.

The inventive method described above can also be modified as follows, either alternatively or additionally.

If the transponder transmits a piece of information, preferably in the first symbol S1' of the return link RL, which differs from the preceding information, for example "modulation off" or "modulation on," then the base station can determine the time that it would require in order to reliably detect this change. In this way, the base station is thus provided with the ability to transmit the maximum speed of a data transmission, and thus the baud rate, for the data section that follows the header section and contains the actual data to be transmitted. Local and regional HF regulations, the sensitivity of the transponder and the base station, any interference spectrum that may be present, etc. must also be taken into account here.

If the transponder changes its modulation again in the preferably next symbol, for example the second symbol S2' of the header section 2, then the base station can also determine the time that it requires to detect this change under these conditions. An additional possibility is to transmit the reference for management of the transmitted spectrum with this symbol.

In another symbol, for example the immediately following symbols S3', the transponder can transmit the modulation coding derived from the two symbols S1, S2 transmitted by the base station, which provides the base station with the ability to verify the configurations it has specified and transmitted to the transponder. It is also possible here to transmit additional identifiers for further optimization of the data communication between base station and transponder after this verification phase, which is to say following the three symbols of a header section in the forward link VL.

The inventive method is suitable for all modulation types in the return link RL, thus for example for NRZI modulation (soft or hard), FM0 modulation or a high-speed modulation such as 3phase1 modulation, in which two bits are transmitted simultaneously per symbol S1-S4.

Another preferred embodiment of the invention results when the transponder changes its modulation within the preferably first or last symbol S1', S4' after a time known to the base station. Since each starting time point is known to the base station by specification of the system clock, it is possible here for the base station to obtain information about the time base of the transponder. This is especially advantageous for asynchronous protocols in particular, for example for the data section, since the base station thus obtains knowledge of the frequency and the tolerance (based on jitter effects) with which the transponder processes the following asynchronous protocol sections. Moreover, this also results in the possibility of using statistical modulation codings such as NRZ modulation, for example.

Especially for asynchronous communication sections, the data rate in the return link RL can also be set in a defined manner with the aid of the header section. To this end, the time duration for a segment, for example a data bit, is determined from the time duration of one or more symbols. The transponder now, for its part, stores this time as a reference for the baud rate and thus for the data transmission speed. This results in a specified, defined protocol for data transmission. Prior solutions have used merely an oscillator internal to the transponder as a reference here. However, this is poorly suited for exact high-speed data transmission, as it offers a very imprecise time base for protocol processing of data communication.

In another very advantageous embodiment of the invention, the base station, after evaluating the information or reference marks transmitted by the transponder, can decide on the manner in which further communication should usefully be continued. To this end, it is not strictly necessary to adjust for an optimal data transmission rate. Instead, the base station for its part can determine, based on its application or user-specific configurations, whether to retain or change the existing setting in the transponder. In this way, in addition to setting an optimal data transmission rate, it is also possible to construct an extremely flexible and intelligent data communication between base station and transponder. In particular, provision can also be made here that demodulation and decoding in the transponder are not set until the base station has received and analyzed all information transmitted by the transponder through the reference marks R1, R3, R4. In this embodiment, the base station would not set the final modulation type in the transponder until this point, which is especially advantageous for stability reasons, since in this case the control system oscillates less.

In a very advantageous embodiment, provision can further be made that the first reference mark R1, which is transmitted in the first symbol S1', signals the base station that the data transmission rate can be increased still further, which results overall in a higher data transmission rate. When the base station evaluates the information contained in the reference mark R1, it is then able to better adjust the data transmission rate on the basis of this information, which is to say to successively increase it as well. This is especially advantageous when the transponder is able to support multiple different frequencies for its internal clock system.

Conversely, for the case where the base station has specified too high a data rate, and thus where a predefined minimum time period is no longer present between two adjacent notches, provision can also be made that the transponder transmits no reference marks R1, R3, R4 in the header section of the return link RL. This signals the base station that a correction must be performed, for example by means of modified clock information in the last symbol S4 of the header section 2.

FIG. 4 shows a block diagram of the structure of an RFID communication system containing a base station and at least one transponder for carrying out the method according to the invention.

The communication system labeled with reference symbol 20 has a base station 21 and a transponder 22. Base station 21 and transponder 22 are in communicative connection here. The communication system is designed as a master/slave communication system in which the base station functions as the master and the transponder or transponders each function as slaves. The base station 21 has a control unit 23 and a transmitting/receiving device 24 (transceiver). In like manner, the transponder 22 has a transmitting/receiving device 25 and a control unit 26. The transmitting/receiving device 24 of the base station 21 is designed to transmit high-frequency carrier signals 29 from the antenna 27 to an antenna 28 of the transponder 22. In the same manner, the transmitting/receiving device 25 of the transponder 22 is designed to transmit corresponding response signals 30 back to the base station 21 in response to the transmitted signals 29 in full-duplex or half-duplex operation.

Data communication is controlled by the control units 23 and 26. The control unit 23, 26 is, e.g., a programmable device, for example a microprocessor or microcontroller.

To carry out the inventive method, the base station 1 has an analysis device 31. The analysis device 31 is arranged in the receive path 32 of the base station 21 after the receiver 24a. The analysis device 31 is also connected to the transmit path 34 of the base station 21 through an adjusting device 33.

Analysis of the header section of the signal transmitted by the transponder 22 in the return link RL now takes place in the analysis device 31. By means of the adjusting device 33, the base station 21 can now in turn adapt the control information transmitted to the transponder through the header section 2 in the forward link VL to the information from the analysis device 31. Advantageously, a method according to the invention which has been described above using FIGS. 2 and 3 is used to this end.

In the present example embodiment, the analysis device 31 and the adjusting device 33 were shown as separate functional units in order to better illustrate the invention. However, these units 31, 33 are typically a component of the control device.

Although the present invention was described above on the basis of a preferred example embodiment, it is not limited thereto, but can rather be modified in many diverse ways.

In particular, the invention is not limited exclusively to RFID systems, but rather can of course also be extended, for example for item identification. Frequently it is not necessary to uniquely identify individual items. In these cases, it is generally sufficient to be able to rule out the presence of e.g. a defective item. This is generally also described as non-unique identification. When a transponder is operated in this context, it has the function of a remote sensor. Thus the invention explicitly also relates to such sensors in which a communication is performed to read and write data of a data carrier or sensor. As an example of such a remote sensor application, reference is made to a temperature sensor, a pressure sensor, or the like.

The data communication system and method described above were described using the "reader talks first" principle. Naturally, the "tag talks first" principle, in which the base station waits for a query from a transponder, would also be conceivable. However, this principle has a poorer reaction time, so that the "reader talks first" principle is used, especially in modern long-range data communication systems.

In FIG. 4, the structure of the base station 21 and the transponder 22 is deliberately shown in an extremely simplified form for the purposes of clarity. It is self-evident that the functional units necessary for data communication between base station 21 and transponder 22, such as demodulator, power supply, synchronization device, decoder, and the like, are of course present in these units 21, 22.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
   receiving at a transponder a forward link having a forward-link header comprising at least one symbol for configuring a setting of the transponder;

transmitting from the transponder a return link having a
return-link header comprising information based on one
or more characteristics of the transponder; and
receiving at the transponder a modified subsequent symbol
of the forward-link header, the modified subsequent
symbol of the forward link header generated by:
analyzing the return-link header to determine adjusted
information for configuring the setting of the transponder;
modifying the subsequent symbol of the forward-link
header in accordance with the adjusted information
for configuring the setting of the transponder.

2. The method of claim 1, wherein the one or more characteristics of the transponder comprise one or more of a resolution and a data transmission rate of the transponder.

3. The method of claim 1, wherein the one or more characteristics of the transponder comprise an operating mode of the transponder.

4. The method of claim 1, wherein the forward link specifies a reference time for one or more of defining a system clock and sets a data communication rate of the transponder.

5. The method of claim 1, wherein analyzing the return-link header comprises determining clock information of the transponder based on a reference mark.

6. The method of claim 1, wherein analyzing the return-link header comprises determining a time separation based on a reference mark.

7. The method of claim 1, wherein the forward link specifies a reference time for modulation by the transponder.

8. A transponder comprising:
a transceiver configured to:
receive a forward link having a forward-link header comprising at least one symbol for configuring a setting of the transponder;
transmit a return link having a return-link header comprising information based on one or more characteristics of the transponder; and
receive a modified subsequent symbol of the forward-link header, the modified subsequent symbol of the forward link header generated by:
analyzing the return-link header to determine adjusted information for configuring the setting of the transponder;
modifying the subsequent symbol of the forward-link header in accordance with the adjusted information for configuring the setting of the transponder.

9. The transponder of claim 8, wherein the one or more characteristics of the transponder comprise one or more of a resolution and a data transmission rate of the transponder.

10. The transponder of claim 8, wherein the one or more characteristics of the transponder comprise an operating mode of the transponder.

11. The transponder of claim 8, wherein the forward link specifies a reference time for one or more of defining a system clock and sets a data communication rate of the transponder.

12. The transponder of claim 8, wherein analyzing the return-link header comprises determining clock information of the transponder based on a reference mark.

13. The transponder of claim 8, wherein analyzing the return-link header comprises determining a time separation based on a reference mark.

14. A circuit configured to:
receive at a transponder a forward link having a forward-link header comprising at least one symbol for configuring a setting of the transponder;
transmit from the transponder a return link having a return-link header comprising information based on one or more characteristics of the transponder; and
receive at the transponder a modified subsequent symbol of the forward-link header, the modified subsequent symbol of the forward link header generated by:
analyzing the return-link header to determine adjusted information for configuring the setting of the transponder;
modifying the subsequent symbol of the forward-link header in accordance with the adjusted information for configuring the setting of the transponder.

15. The circuit of claim 14, wherein the one or more characteristics of the transponder comprise one or more of a resolution and a data transmission rate of the transponder.

16. The circuit of claim 14, wherein the one or more characteristics of the transponder comprise an operating mode of the transponder.

17. The circuit of claim 14, wherein the forward link specifies a reference time for one or more of defining a system clock and sets a data communication rate of the transponder.

18. The circuit of claim 14, wherein analyzing the return-link header comprises determining clock information of the transponder based on a reference mark.

19. The circuit of claim 14, wherein analyzing the return-link header comprises determining a time separation based on a reference mark.

20. The circuit of claim 14, wherein the forward link specifies a reference time for modulation by the transponder.

* * * * *